(12) United States Patent
Ronström

(10) Patent No.: US 6,438,707 B1
(45) Date of Patent: Aug. 20, 2002

(54) FAULT TOLERANT COMPUTER SYSTEM

(75) Inventor: Mikael Ronström, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/371,409

(22) Filed: Aug. 10, 1999

(30) Foreign Application Priority Data

Aug. 11, 1998 (DE) .......................................... 198 36 347

(51) Int. Cl.[7] .................................................. H02H 3/05
(52) U.S. Cl. .............................. 714/13; 714/11; 714/37
(58) Field of Search ............................. 714/37, 11, 13, 714/12, 10

(56) References Cited

U.S. PATENT DOCUMENTS

| | | | |
|---|---|---|---|
| 4,590,554 A | * 5/1986 | Glazer et al. .................. | 714/13 |
| 5,005,174 A | * 4/1991 | Bruckert et al. ............... | 714/11 |
| 5,134,704 A | 7/1992 | Leuty .......................... | 395/575 |
| 5,384,783 A | 1/1995 | Satomi et al. ................ | 371/9.1 |
| 5,455,932 A | 10/1995 | Major et al. .................. | 395/489 |
| 5,473,771 A | 12/1995 | Burd et al. ............ | 395/182.02 |
| 5,544,304 A | 8/1996 | Carlson et al. ........ | 395/182.08 |
| 5,551,047 A | 8/1996 | Mori et al. ................... | 395/800 |
| 5,619,656 A | 4/1997 | Graf ...................... | 395/200.11 |
| 5,623,532 A | 4/1997 | Houde et al. .................. | 379/58 |
| 5,661,668 A | 8/1997 | Yemini et al. ............... | 364/550 |
| 5,958,070 A | * 9/1999 | Stiffler ......................... | 714/10 |
| 5,978,932 A | * 11/1999 | Nishiyuki et al. ............ | 714/11 |

FOREIGN PATENT DOCUMENTS

| | | | |
|---|---|---|---|
| BA | PCT/EP99/05739 | 12/1999 | |
| DE | 196 25 195 A1 | 1/1998 | ............ G05B/9/03 |
| EP | 0 441 087 A1 | 8/1991 | ............ G06F/11/20 |
| WO | WO 93/09494 | 5/1993 | ............ G06F/11/16 |
| WO | WO 97/22054 | 6/1997 | ............ G06F/11/20 |

* cited by examiner

Primary Examiner—Robert Beausoleil
Assistant Examiner—Yolanda L. Wilson
(74) Attorney, Agent, or Firm—Jenkens & Gilchrist, P.C.

(57) ABSTRACT

Fault tolerant computer system and method requiring reduced inter-unit communications. A primary system is arranged to execute event processes in response to received commands. Each time the execution of an event process is halted, due to normal termination or an interrupt, an event generator generates an event message indicating the type of event process and the reason or timing for halting the event process. The event message is used to instruct a backup system to execute the same event process. Since the event message also specifies the reason and the timing for halting the event process, the execution of the event process can be replicated at the backup system. Thus, the primary system and the at least one backup system will be synchronized. At least one standby system may be provided for recording in an event log the sequence of event messages, and for storing an archive copy of memory contents of the primary system. The event log with the archive copy may be used to restore the system state of the primary system.

27 Claims, 8 Drawing Sheets

FAULT TOLERANT COMPUTER SYSTEM

FIELD OF THE INVENTION

The present invention relates to a fault tolerant computer system and to a method of fault tolerant operation of a computer system.

BACKGROUND OF THE INVENTION

Computers or computer systems are increasingly employed for fault sensitive applications, such as banking systems or telecommunications networks. Severe problems may arise if the computer fails, or even in case of a single faulty operation. For example, in a banking system an amount of money may erroneously be transferred between accounts, in a telecommunications system communication lines may be interrupted without notice, undesired connections may be established or the system may come to a complete halt for a prolonged period of time. Obviously, it is desirable to avoid such problems.

A generally known method to cope with the above problem is to replicate a computer system on a one-to-one basis, and to make both computer systems execute the same sequence of instructions. However, this will require a high inter-unit communication load between the two computer systems, since operations need to be checked and synchronized on a very detailed level. Further, computers increasingly operate at higher frequencies where the handling of the inter-unit communications becomes an important cost factor.

An approach to reduce a inter-unit communication load is described in U.S. Pat. No. 5,544,304. Commands are received and queued by both, an active and a stand-by unit. Only the active unit processes the commands. The system provides short messages which are transmitted between the active and stand-by units inquiring about, or providing the status of particular commands. A periodic handshaking is executed between the two units involving short signals which are exchanged between controllers of the active and stand-by unit.

However, in case of a failure, this system requires a long time to restart operations using the stand-by units, since with only periodic handshaking performed between the units, a high level of synchronization cannot be maintained.

SUMMARY OF THE INVENTION

It is therefore an object of the invention, to provide a fault tolerant computer system and a method of operating a fault tolerant computer system requiring a low communication load between a primary system and a backup system while allowing a high level of synchronization.

This object of the invention is solved by a Fault tolerant computer system, comprising: a primary system connected to external devices, including: a primary central processing unit for executing event processes, an event process being a process executed upon the occurrence of a command at the primary system; primary memory means connected to the primary central processing unit for storing system data and application data; an event generator connected to the primary central processing unit for generating an event message each time the primary central processing unit halts the execution of an event process, the event message at least including information about the type of event process and the reason for halting the execution of the event process; at least one backup system connected to the primary system, including: a backup central processing unit for executing event processes, backup memory means connected to the backup central processing unit for storing system and application data; a buffer for receiving and intermediately storing a sequence of event messages from the primary system; and backup control means connected to the backup central processing unit, for scheduling the execution of event processes in accordance with the event messages.

The object of the invention is further solved by a method of fault tolerant operation of a computer system, including a primary system and at least one backup system, including the steps of: at the primary system: executing event processes by a primary central processing unit, an event process being a process executed upon the occurrence of a command at the primary system; generating an event message each time the primary central processing unit halts the execution of an event process, the event message at least including information about the type of the event process and the reason for halting execution of the event process; transmitting each event message to at least one backup system; at the at least one backup system: recording and intermediately storing the event messages from the primary system in a buffer; scheduling the execution of event processes of corresponding event messages at the buffer; and executing the event processes by the backup central processing unit in accordance with the event messages.

According to the invention, a primary system comprises a primary central processing unit, primary memory means for storing system data and application data and an event generator for generating an event message each time the primary central processing unit halts the execution of an event process. The event message at least includes information about the type of event process and the reason for halting the execution of the event process. At least one backup system is provided, comprising a backup central processing unit, backup memory means and a buffer for receiving and intermediately storing a sequence of event messages received from the primary system. Backup control means schedule the execution of event processes corresponding to respective event messages. The event processes are executed at the primary system and at the backup system in the same manner.

Advantageously, the primary processing unit reports an event message to the backup system only in case the execution of an event process is halted. This allows a significant reduction of inter-unit communications, a detailed check of the status of the at least one backup system by the primary system is no longer required.

Since at the at least one backup system all necessary information about the event process and the reason for halting the execution of the event process is known via the event messages, the at least one backup system is able to replicate the course of execution of the event processes at the primary system. This includes data accessed, generated or otherwise affected, and includes halting an event process at exactly the same location or point in time, i.e., after the same number of instructions, as before at the primary system.

With an exactly identical execution of event processes at the primary system and at the at least one backup system, a high level of synchronization between the states of the primary system and the at least one backup system, including memory contents, may be achieved. It is not any longer necessary to check, e.g. memory means on a detailed level or to report changes to the memory means, as it was required previously. The at least one backup system will apply exactly the same changes to the data base or system data as they were applied at the primary system.

In an advantageous embodiment of the invention, two possible reasons for halting an event process are considered.

Firstly, an event process can be terminated normally, i.e. if the execution of the corresponding command has been completed. Secondly, an event process may be interrupted, e.g., by a further command, requesting the execution of another event process and having a higher priority level. Thus, information will be included into the event message whether the event process was halted due to a normal termination or due to an interrupt.

In a further advantageous embodiment of the invention, means are provided for generating event data indicative of the execution of an event process both at the primary system and at the at least one backup system. Further, means are provided, for detecting a system fault based on a comparison of the event data generated at the primary system and at the at least one backup system. Thus, it can be determined whether the operation of the computer system is fault free. In case it is detected, that a fault occurred at the primary system, a backup system may be selected to assume function as new primary system. A fault may include a software fault or a hardware fault at the primary system or a hardware fault at the backup system. Any number of backup systems may be provided, to further enhance the fault tolerance of the system. E.g. a plurality of backup systems simplifies a fault localization.

Further, at least one stand-by system may advantageously be provided for receiving and storing an archive copy of system data and application data. The stand-by system may also record the sequence of event messages generated at the primary system in an event log. The stand-by system may be arranged to execute event processes corresponding to the event messages stored in the event log, using the archive copy of system and application data. Thus, if all events after generating the archive copy are known at the stand-by system, the archive copy of system and application data can be updated to a current version without loss of any data or event processes. The stand-by systems add further fault tolerance capabilities, since at any time the state of the primary system may be recovered.

The primary system may be connected to a plurality of external devices, which may be regional processors or distributed central processors of the computer system. Event processes may be constituted by executing a signal from a regional processor, executing a signal from a distributed central processor. Further, an event process may be constituted by a scanning operation of a processor job table due to an internal timer interrupt, and may be constituted by an internal function of the primary system. By defining external event processes, caused by commands from regional processes or distributed central processes, and internal event processes, caused by timer interrupts or other system functions, all possible changes of the system state of the primary system may be described.

Advantageously, an event message may include a sequence number indicating an execution sequence of event processes, for example, if the sequence of event processes is not defined by the sequence of reception of event messages at the at least one backup system. Further, the event message may comprise a number of instructions executed, e.g., to facilitate specifying event process halt conditions. An event message may further comprise register states at the primary system upon occurrence of an interrupt, as well as a data defined or accessed by the event process. Combining this information in an event message allows to even more fully describe an event process, such that it may be executed and halted at the at least one backup system in exactly the same manner.

In case of a software fault is detected at the primary system, the event message may include information specifying the software fault and information enabling the backup system to avoid the software fault. Subsequently the backup system may take over operations.

According to another advantageous embodiment of the invention, a plurality of processing nodes may be provided, each including a primary system for a first processing node and a backup system for a second processing node. Further, each processing node may include a standby system for a third processing node. Thus, each node at the same time may function as primary system and/or backup system and/or stand-by system. Means are preferably provided, for a communication between all nodes. It is possible that the primary processing unit, the backup processing unit and the stand-by processing unit are constituted by a single data processing unit.

The object of the invention is also solved by a fault tolerant computer system, comprising: a primary system connected to external devices, including: a primary central processing unit for executing event processes, an event process being a process executed upon the occurrence of a command at the primary system; primary memory means connected to the primary central processing unit for storing system data and application data, an event generator connected to the primary central processing unit for generating an event message each time the primary central processing unit halts the execution of an event process, the event message at least including information about the type of event process and the reason for halting the execution of the event process; at least one backup system connected to the primary system, including: a backup central processing unit for executing event processes; backup memory means connected to the backup central processing unit for storing system and application data; a buffer for receiving and intermediately storing a sequence of event messages from the primary system; backup control means connected to the backup central processing unit, for scheduling the execution of event processes in accordance with the event messages; at least one standby system, including: first standby memory means for receiving and storing an archive copy of system data and application data; and second standby memory means for recording, after the archive copy was generated, a sequence of event messages in an event log.

Moreover, the object of the invention is solved by a fault tolerant computer system, comprising: a primary system connected to external devices, including: a primary central processing unit for executing event processes, an event process being a process executed upon the occurrence of a command at the primary system; primary memory means connected to the primary central processing unit for storing system data and application data; an event generator connected to the primary central processing unit for generating an event message each time the primary central processing unit halts the execution of an event process, the event message at least including information about the type of event process and the reason for halting the execution of the event process; at least one backup system connected to the primary system, including: a backup central processing unit for executing event processes; backup memory means connected to the backup central processing unit for storing system and application data; a buffer for receiving and intermediately storing a sequence of event messages from the primary system; backup control means connected to the backup central processing unit, for scheduling the execution of event processes in accordance with the event messages; and wherein upon detection of a software fault at the primary system, an event message includes information specifying the software fault, and the backup system skips execution of at least part of the corresponding event process.

Still further, the object of the invention is solved by a method of fault tolerant operation of a computer system, including a primary system, at least one backup system and at least one standby system, including the steps of: at the primary system: executing event processes by a primary central processing unit, an event process being a process executed upon the occurrence of a command at the primary system; generating an event message each time the primary central processing unit halts the execution of an event process, the event message at least including information about the type of the event process and the reason for halting execution of the event process; transmitting each event message to at least one backup system; at the at least one backup system: recording and intermediately storing the event messages from the primary system in a buffer; scheduling the execution of event processes of corresponding event messages at the buffer; executing the event processes by the backup central processing unit in accordance with the event messages; at the at least one standby system: receiving and storing an archive copy of system data and application data from the primary system; and recording, in an event log at the at least one standby system, a sequence of event messages, generated at the primary system after the archive copy was generated.

And, the object of the invention is solved by a method of fault tolerant operation of a computer system, including a primary system and at least one backup system, including the steps of: at the primary system: executing event processes by a primary central processing unit, an event process being a process executed upon the occurrence of a command at the primary system; generating an event message each time the primary central processing unit halts the execution of an event process, the event message at least including information about the type of the event process and the reason for halting execution of the event process; transmitting each event message to at least one backup system; at the at least one backup system: recording and intermediately storing the event messages from the primary system in a buffer; scheduling the execution of event processes of corresponding event messages at the buffer; and executing the event processes by the backup central processing unit in accordance with the event messages; and wherein upon detection of a software fault at the primary system, an event message includes information specifying the software fault, and the backup system skips execution of at least part of the corresponding event process.

Further, advantageous embodiments of the invention are described in further dependent claims.

The invention may be more fully understood, if the following description of preferred embodiments of the invention is read in conjunction with the accompanying drawings:

DETAILED DESCRIPTION OF EMBODIMENTS

Figure 1:
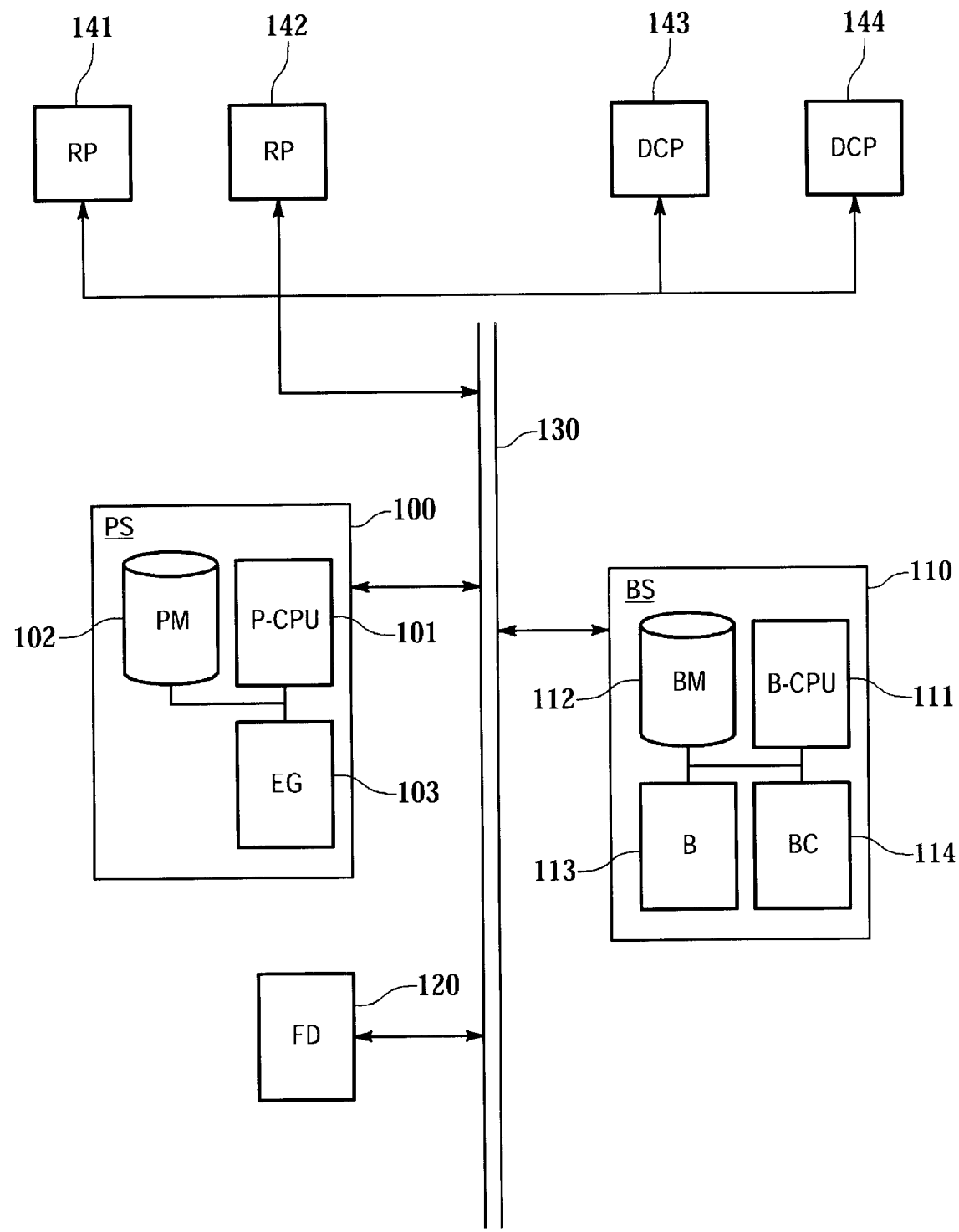
FIG. 1 shows an embodiment of the fault tolerant computer system according to the invention.

In the following, preferred embodiments of the invention are described with respect to the FIGS. 1–7. Throughout the figures, like reference numeral denote like components.

FIG. 1 shows a first embodiment of the fault tolerant computer system according to the invention. The fault tolerant computer system of FIG. 1 is comprised of a primary system 100 (PS), a backup system 110 (BS), fault detection means 120 (FD) and a plurality of external devices 141, 142, 143 and 144. Central communication means 130 are provided, allowing individual system components to communicate with each other.

The fault tolerant computer system of the embodiment of the invention according to FIG. 1 may be employed in any fault sensitive application, e.g., banking systems, booking systems and telecommunications network.

According to the invention, the primary system is responsible for operations, i.e., the primary system executes all operations necessary for the application. In the present case, the primary system, e.g., in a telecommunications network, is responsible for receiving requests for communication links, is responsible for establishing communications, and for handling subscriber service data, subscriber location data etc.

The backup system does not directly execute functions or operations of system, but provides the primary resource for allowing a fault tolerant operation of the computer system.

The external devices 141–144 are preferably arranged to communicate with the primary system 100, for issuing commands or generating events at the primary system. In a telecommunications network, the external devices may be constituted by switches, regional processors of a distributed telecommunications network, or may be units of a distributed central processing system, e.g. in a mobile switching center of a telecommunications network. The external devices may also issue requests for communication, commands requesting information about subscriber services or send notifications about actions taken by the external devices and similar.

All interactions with external devices, e.g. commands, are preferably handled by the primary system 100. The backup system 110 may also receive commands, preferably however, the backup system will not directly process the commands.

Depending on the structure of the internal communication means 130 of FIG. 1, all components of the fault tolerant computer systems are mutually connected via the communication means 130, however, in other embodiments the external devices 141–144 may only be connected to the primary system 100. Depending on the operation of the fault tolerant computer system, e.g., upon a system fault at the primary system, the external devices 141–144 could be disconnected from the primary system and connected to the backup system 110. For this purpose, switching means could be provided, however, this does not form part of the invention and is therefore not further described.

The primary system 100 comprises several components for operating the computer system according to the invention. Preferably, the primary system comprises a primary central processing unit 101 (P-CPU) for receiving and processing commands and handling communications with the external devices 141–144.

Further, the primary system 100 comprises primary memory means 102 (PM) for storing system data related to the system state of the primary system as well as application data related to the application. In the present embodiment, subscriber data and internal data may be stored within the primary memory means. In FIG. 1, the primary memory means is shown as a single unit, however, the primary memory means 102 may also be divided into separate units. A first unit could store system data relating to the system state of the primary system, a second unit of the primary memory means could be constituted by a data base for storing subscriber data.

Operations of the primary central processing unit 101 are controlled by commands, as it is known in the art. Operations of the primary central processing unit 101 will, e.g., affect the system state or contents of the primary memory means.

A command could be issued by one of the external devices 141–144, or could be generated internally, according to certain system states of the primary system 100. In either case, the primary central processing unit 101, upon reception of a command, or event, will take action in executing the command in an event process. An event process may cause a change of data stored in the primary memory means 102 and may result in a communication to one of the external devices 141–144, etc.

During the execution of an event process, further commands or instructions for execution of further event processes may be generated. A command preferably results in sequence of system operations at the primary system, including operations of the primary central processing unit and may include changes to data stored within primary memory means, such as application data or system data.

As common in digital signal processing, the execution of an event process upon reception of a command or an event may be ended due to a normal termination, or may be interrupted by a further command or event, e.g., having a higher priority level. In this case, current operations of the primary central processing unit 101 will be halted, the command having higher priority will be executed, and thereafter, execution of the first command may be resumed. An interrupt may, for example, occur upon notification by internal timing means, or may be received from the outside world. The occurrence of an interrupt may not only depend on interaction with the outside world, it may also be caused by internal events within the primary system. Therefore, the exact timing of commands, or events or interrupts within the primary system are not easily determined and thus, it is not sufficient to, e.g., only report the occurrence of commands or interrupts, it is required to accurately state all circumstances and the accurate timing when an interrupt occurred.

In order to assure that the backup system will have the exact same state and memory content as the primary system, according to the invention, an event generator 103 (EG) is provided, connected to the primary central processing unit 101 for generating an event message each time the primary central processing unit halts the execution of an event process (the. execution of a command). As outlined above, for a synchronization between a backup system and a primary system, it is insufficient, to just report commands or events, it is also necessary to transmit further information about the course of execution of an event process. Therefore, the event message at least includes information about the type of event process executed at the primary system and further includes information about the reason and circumstance for halting the execution of the event process.

The backup system 110, similarly to the primary system, preferably comprises a backup central processing unit 111 (BCPU), and backup memory means 112 (BM). As the primary memory means, the backup memory means is arranged to store system data related to the system state of the backup system, as well as application data.

Further, the backup system comprises a buffer 113 (B) for receiving and intermediately storing a sequence of event messages generated at the primary system 100, and comprises backup control means 114 (BC), connected to the backup central processing unit, for scheduling the execution of event processes, e.g., in the order of reception of corresponding event messages at the buffer from the primary system or according to an event process indicator, for indicating an execution sequence of event processes at the primary system.

It is noted that, even though in FIG. 1 only a single backup system is illustrated, a plurality of backup systems may be provided, all executing a sequence of event processes corresponding to the primary system.

Therefore, with a short time delay, e.g., in the range of 0.5 ms to 1 ms, the backup system will execute the exact same sequence of event processes as they were executed at the primary system and the primary memory means 102 and the backup memory means 112 will be synchronized.

If a command is received at the primary system or generated within the primary system, i.e., if an event occurs at the primary system 100, the primary central processing unit 101, according to a scheduling policy, will execute an event process according to the command. At a certain point in time, the event process will be halted, either due to a normal execution of the event process or due to an interrupt. In both cases, at the time of halting the execution of an event process, the event generator will generate an event message comprising information indicative of the event process and indicating the reason for halting the process. The reason for halting the process, as outlined before, may be normal termination due to a complete execution of the event process, or the occurrence of an interrupt.

Preferably after halting the event process at the primary system, the event message is transmitted to the backup system, where, controlled by the backup control means 114, the corresponding event process will be executed with a small time delay as compared to the primary system.

An event message may also comprise a sequence number indicating an execution sequence of event processes at the primary system, it may include a number of instructions executed, until the execution of the event process at the primary system was halted. Further, an event message may comprise register states of the primary system upon occurrence of an event and data defined or accessed by the event process.

It is noted, that all possible processes within the primary system need to be properly defined by event processes so that no undefined processes can cause a different execution in the primary and the backup system. Therefore, it has to be assured that communication, e.g. with external I/O systems is performed within the concept of well defined event processes. The unstructured and direct communications with file systems TCP/IP and so forth is not allowed. The communication must go through well defined signals handled by the primary central processing units by way of execution of event processes. If these prerequisites are fulfilled, event messages can be used for fully describing all transitions within the primary system, affecting system state or affecting data stored in the primary memory means.

As an important feature of the invention, event messages are generated once the execution of an event process is halted/terminated, thus being able to deliver accurate information about the execution of the event process to the backup system, including data about the event process and the reason for halting the event process. An event process may be constituted by executing a signal from an external device, for example a regional processor or a distributed central processor. An event process may also be constituted by a scanning instruction of a job table due to a timer interrupt of an internal timer within the primary system. Further, an event process may be constituted by the execution of an internal function of or within the primary system. Accordingly, upon termination of the event processes, the event generator 103 of the primary system generates an event message, comprising at least the type of event process, and the reason for halting the event process.

If an event is to perform a scan job table, the scan is performed, and an event message is generated by the event generator upon normal termination of the scan job table event process or upon interrupt of the scan job table process.

Further, an event message may be generated upon reception of a command or signal from an external device, e.g. a regional processor or a distributed central processor.

As outlined before, the event messages will be transmitted to the backup system 110, where they preferably will be intermediately stored in the buffer 113. The backup control means 114 will then schedule the execution of event processes according to the event messages received in the buffer or according to a sequence number contained in the event message.

Each event message comprises all necessary information for executing an event process, the backup control means 114 will be able to instruct the backup central processing unit 111 to execute the same event process as it was previously executed at the primary central processing unit. Further, since each sent message comprises information about the reason for halting, an event process, the backup control means will be able to instruct the backup central processing unit 111 to halt the execution of the event process at exactly the same location as it was halted in the primary central processing unit 101. Location in this context is a point during execution when the backup central processing unit has achieved the same level of execution of the event process, as it was achieved at the primary central processing unit when the corresponding event process was halted. Thus, if the event process at the primary system was terminated upon normal execution, the corresponding event process at the backup system will also be terminated upon normal execution. If the event process at the primary system was halted upon an interrupt, the execution of the corresponding event process at the backup system will be interrupted at exactly the same stage of execution of the event process.

The exact correspondence or synchronization between the primary system and the at least one backup system only prevails until a faulty operation at the primary system and/or the at least one backup system occurs. Therefore, a system fault may be detected by comparing execution parameters from the primary system and at the backup system.

The fault tolerant computer system according to the invention may comprise fault detection means 120 for detecting a system fault. The fault detection means 120 may be a separate unit, connected to the data communication means 130, or may be included either into the backup system 110 or the primary system 100, or any other device of the fault tolerant computer system.

Preferably, the fault detection means 120 will compare data recorded about the execution of an event process at the primary system with data recorded about the execution of the corresponding event process at the backup system. The fault tolerant computer system preferably comprises first means for generating event data indicative of the execution of an event process at the primary system and comprises second means for generating event data indicative of the execution of the same event process at the at least one backup system.

The event data generated at the primary system and the backup system will preferably be transmitted to the fault detection means, which, on reception of event data will detect a system fault based on a comparison of the event data. If the event data from the primary system and the backup system fully agree, a system fault did not occur. In case the event data about the execution of an event process at the primary system and the backup system do not agree, a system fault is indicated. The detection of a system fault is based on the comparison of system data at the primary system and the at least one backup system is known in the art and therefore not further outlined. For example, in case a plurality of backup systems are provided, a majority vote could be used for determining, at which location the fault occurred.

If a system fault of the primary system is detected, a backup system may be selected to assume system functions as new primary systems. In this case, operations of the computer systems will no longer be executed by the primary system, but taken over by the backup system. Depending on the structure of the computer system, in particular of the communication means 130, this will involve switching communication links between the external devices 141–144 from the primary system to the selected one of the backup systems.

Since the primary system and the backup system are constantly maintained at a high level of synchronization, i.e., are operating delayed only by a very short period of time, e.g., 0,5 ms to 1 ms, the selected backup system can readily assume functions of the primary system, without loss of data, commands and without an extended downtime.

In the following, with respect to FIG. 2, a second embodiment of the fault tolerant computer system of the invention will be described.

Figure 2:
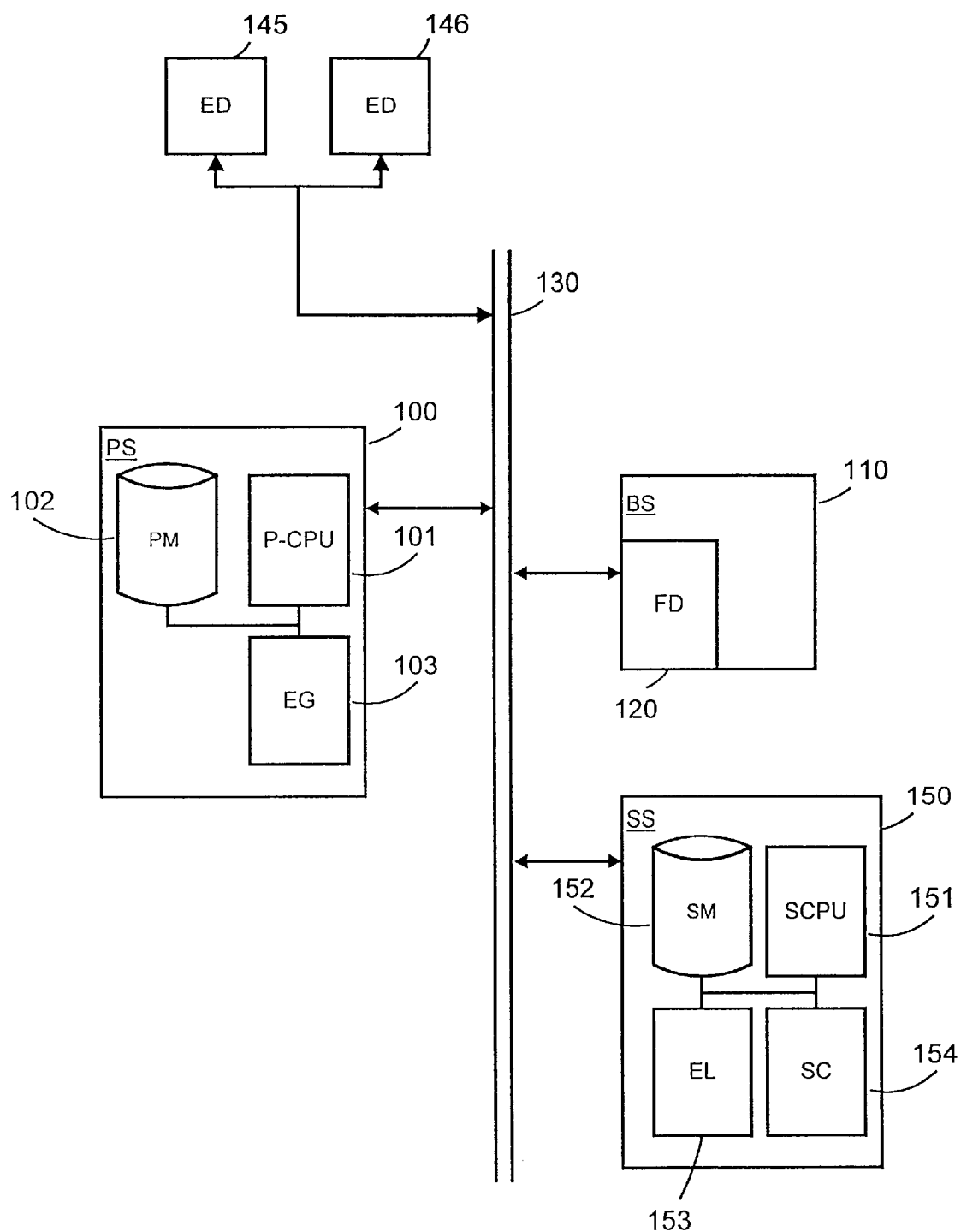
FIG. 2 shows a further embodiment of the fault tolerant computer system according to the invention.

FIG. 2 shows an example of the fault tolerant computer system, similar to the one depicted in FIG. 1.

Further to the primary system 100 and the backup system 110, in the second embodiment a standby system 150 is provided. Moreover, contrary to the first embodiment of the invention of FIG. 1, the fault detection means 120 is incorporated into the backup system 110. External devices 145 and 146 are provided. The communication means 130 now connect the primary system 100, the backup system 110, the standby system 150 and the external devices 145 and 146.

As in the example described with respect to FIG. 1, in this second embodiment of the invention, the backup system executes exactly the same sequence of event processes as the primary system and, as before, data stored in the primary memory means and the backup memory means will be synchronized.

The event generator 103 generates an event message each time the execution of an event process at the primary system is halted, e.g. due to normal termination of the event process or due to the occurrence of an interrupt. As before, the event message may comprise a sequence number indicating an execution sequence of event processes, may comprise a number of instructions executed, register states, e.g., if an interrupt occurred, as well as data defined or accessed by the event process. The event message may also comprise event data indicative of the execution of the corresponding event process at the primary system, for comparison with event data corresponding to the execution of the event process at the backup system.

Besides being transmitted to the backup system, in this second embodiment, the event messages are also transmitted to the standby system 150.

It is noted that a plurality of standby systems may be provided, even though only a single one is shown in FIG. 2.

The standby system preferably does not execute event processes, but only log received event messages in an event log 153 (EL). In example of FIG. 2, the standby system 150 comprises standby memory means 152, for storing an archive copy of data stored at the primary memory means 102. Preferably, according to the invention, an archive copy of system and application data stored at the primary memory means 102 is transferred to the standby memory means in certain time intervals. For example, an archive copy may be generated once per hour, once per day, etc.

In order to be able to reproduce the system state of the primary system, all event messages after generating an archive copy need to be considered. Therefore, it is preferred that after transferring an archive copy to the standby system, all event messages received from the primary system are recorded in an event log. Thus, since the event messages clearly define the course of execution of event processes at the primary system 100, including type of event, reason and timing for halting the execution of the event processes, etc., the event log together with the archive copy stored at the standby memory means 152 may be used to recover the system state of the primary system.

The standby system 150 may also comprise a standby central processing unit 151 and a standby command means 154. If the system state of the primary system, e.g., upon a fault of the primary system, needs to be recovered, the standby control means 154 may generate instructions in accordance with the sequence of event messages stored in the event log, causing the standby central processing unit to execute exactly the same sequence of event processes in exactly the same manner, as they were executed at the primary system. Accordingly, even though with a time delay, the same changes are applied to the data of the archive copy stored in the standby memory means 152.

The standby system very much resembles the backup system, as outlined with respect to FIG. 1, however, the standby system is primarily intended for recording event messages in an event log and for recording archive copies of memory contents of the primary system in order to be able to recover the system state of the primary system at a later point in time.

If, e.g., a system fault at the backup system is detected, the stand-by system may take over operations of the backup system.

Further, in case a software fault is detected at the primary system, e.g., if the primary system is not any longer able to continue operations, the event message transmitted to the backup system may include information specifying the software fault and information enabling the backup system to avoid the software fault. In this case the backup system may, e.g., skip execution of an event causing the software fault or skip certain communication or software routines during execution of the event. The software fault may also be reported to standby systems. Of course, after the fault at the primary system, the backup system may take over operations of the primary system, as it was outlined before. Thus a forward error correction may be achieved.

Figure 3:
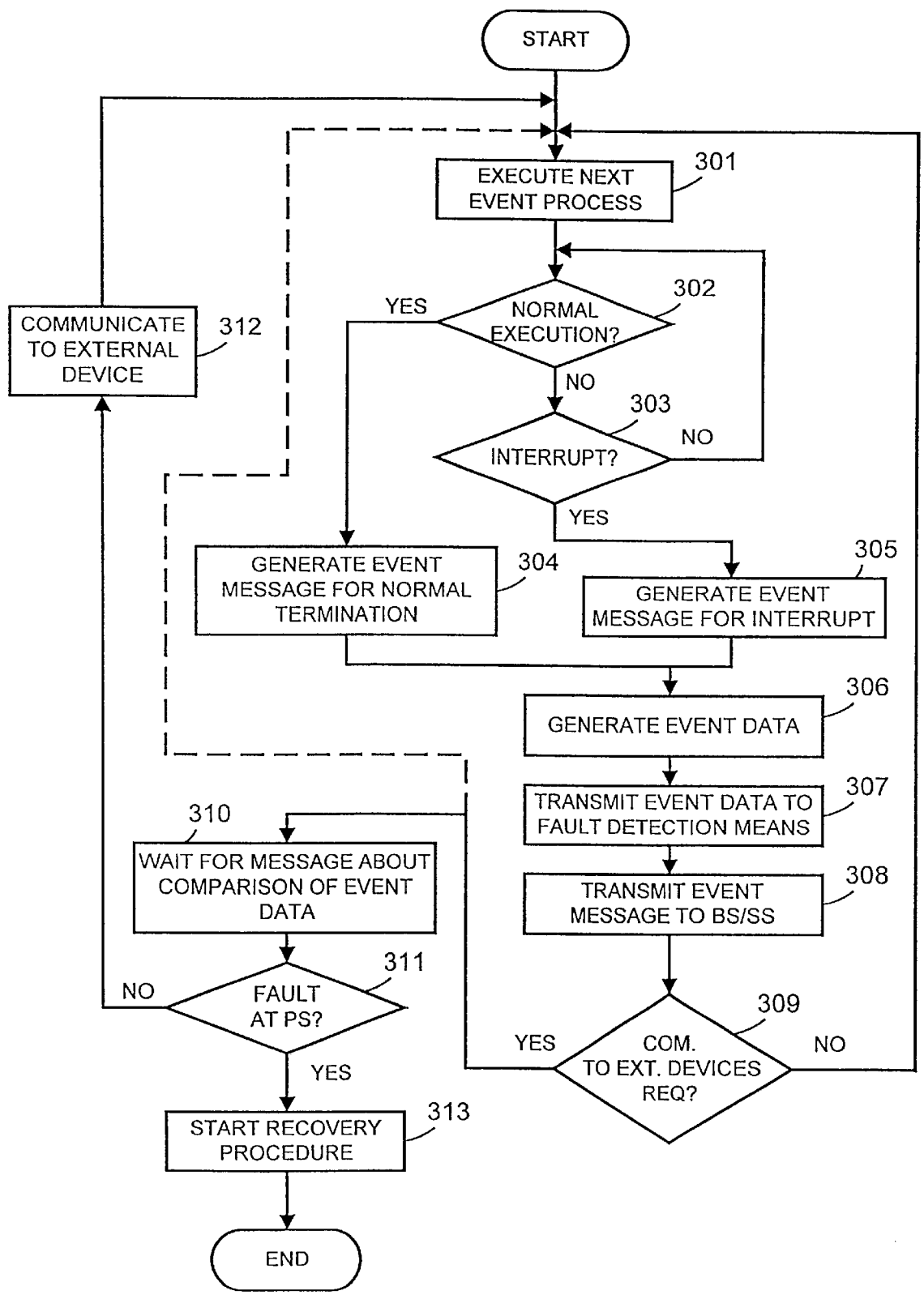
FIG. 3 shows a flow diagram of an example of the method of fault tolerant operation of a computer system according to the invention.

FIG. 3 shows a flow diagram of an example of the method of fault tolerant operation of a computer system according to the invention. As in the cases before, the computer system comprises a primary system, a backup system and, optionally, a stand-by system. In the following, with respect to FIG. 3, operations of the primary system during fault tolerant operation of the computer system will be described.

The system may be arranged as the first and second embodiments of FIG. 1 and FIG. 2. In particular, backup system is arranged for receiving event messages generated upon execution of an event process at the primary system. However, the flow of FIG. 3 predominantly describes operations at the primary system.

In a step denoted 301, the primary central processing unit executes an event process, e.g., a next process upon a next command to be executed, based on a scheduling policy. The event process may be a next event process in a sequence of event processes to be executed at the primary system, instructed by commands received from external devices. An event process may also be executed upon notification by timing means internal to the primary system. This may, for example, be an instruction due to an internal timer interrupt to scan a job table. An event process may also be executed in association with an internal function of the primary system.

During the execution of the event process, further commands or instructions for execution of further event processes may be generated. A command preferably results in a sequence of system operations at the primary system, including operations of the primary central processing unit and may include changes to data stored within primary memory means, such as application data or system data. Again, as in previous embodiments, all possible operations of the primary system must be part of an event process. The primary central processing unit may not execute any other operations than event processes.

At a certain point in time, the execution of the current event process will be terminated, e.g., as a result of a normal completion of execution, or the execution of the event process is forcibly halted due an interrupt. Thus, in a step denoted 302 it is checked, whether upon halting the event process, a normal execution of the current event process took place, i.e., the event process is supervised, in order to determine, whether a normal execution took place.

In case the normal execution of the current event process is detected, in a step 304, an event message indicating the normal termination of the current event process is generated. This event message may at least include information about the type of the current event process and an indication, that the current event process was terminated due to normal execution. The event message may further include a sequence number indicating an execution sequence of event processes, which may be advantageous, in case a preferred sequence of execution of event processes is not only determined by a sequence of reception of corresponding event messages, e.g., at the backup system. The event message may also comprise information regarding data defined or accessed by the event process, in particular data relating to the system state or application data stored in the primary memory means.

In other words, it needs to be assured that the event message comprises all necessary data for describing the corresponding current event process, allowing the execution of exactly the same event process at the backup system. Normally, it should be sufficient to transmit an identifier of the kind of event process executed and to transmit parameters specifying the environment of execution of the event process, e.g., in case of a telecommunication system, for identifying a subscriber, telecommunication lines, and similar.

In a step 303, the occurrence of an interrupt is checked. In case in step 303 an interrupt is not detected, the flow returns to step 302. If an interrupt is detected, in a step 305 an event message is generated, now indicating, that the current event process was interrupted. The corresponding event message will preferably also contain information about the exact point in time during execution of the current event process, when the interrupt occurred. The event message may include a number of instructions, e.g., assembler instructions, executed until the interrupt occurred. Further, the event message may comprise register states of the primary system, in particular of the primary central processing unit, present at the time of interruption. Further, like the event message generated in step 304, a sequence number indicating an execution sequence of event processes may be included, as well as information about data defined or accessed by the event process.

In a step 306 event data are generated, indicative of the course of execution of the current event process at the primary system. Preferably, the event data will include information allowing to determine whether the event process was executed fault free. This may e.g., include information about system state or certain key data or check signals, as it is known in the art.

The event data, in a step 307, are transmitted to the fault detection means 120. If the fault detection means is incorporated into the backup system, the event data may also be included into the event message and transmitted therewith, in a step 308, to the backup system and/or stand by system, if provided.

In a step 309 it is determined whether upon execution of the current event process, a communication to an external device is required. A communication to an external device may, for example, include communication to another processor, or to any other device. This determining step may be executed in order to avoid, in case a faulty operation occurred at the primary system, that with the communication to the external device the fault will further propagate throughout the computer system.

In case in step 309 a communication to an external device is not required, the flow may directly return to step 301, for execution of a subsequent event process.

If a communication to an external device upon execution of the event process is required in step 309, in a step 310, the primary system may wait for a message indicating the comparison result of event data generated at the primary system and backup system and compared by the fault detection means. During waiting for the comparison result, the primary system may intermediately execute further event processes, e.g., event processes not requiring a communication to external devices. However, also event processes may be intermediately executed, which require an external communication. In this case, a plurality of comparison messages will be awaited simultaneously.

In a step 311, upon reception of the message about comparison of the event data from the primary system and the backup system, it is determined whether the operation of the primary system was fault free. If yes, in a step 312, the requested communication to an external device is performed, and the flow returns to step 301 and the next event process, according to a scheduling policy, is executed.

In case in step 311 it is determined that the primary system did not execute the current event process in a fault free operation, in a step 313 a recovery procedure is started. The recovery procedure may comprise assigning one of the at least one backup systems as new primary systems and may further comprise switching over communication links to external devices from the primary system to the backup system. In case the fault tolerant computer system also comprises standby systems, the recovery procedure may include applying an event message log recorded at the standby system to an archive copy transferred beforehand to the standby system. After the recovery procedure, operations of the primary system are terminated, e.g., for a repair.

It is noted that the sequence of steps not necessarily follows the flow of FIG. 3, the sequence may be different in further embodiments, e.g., event data may be generated before an event message and the like.

Figure 4:
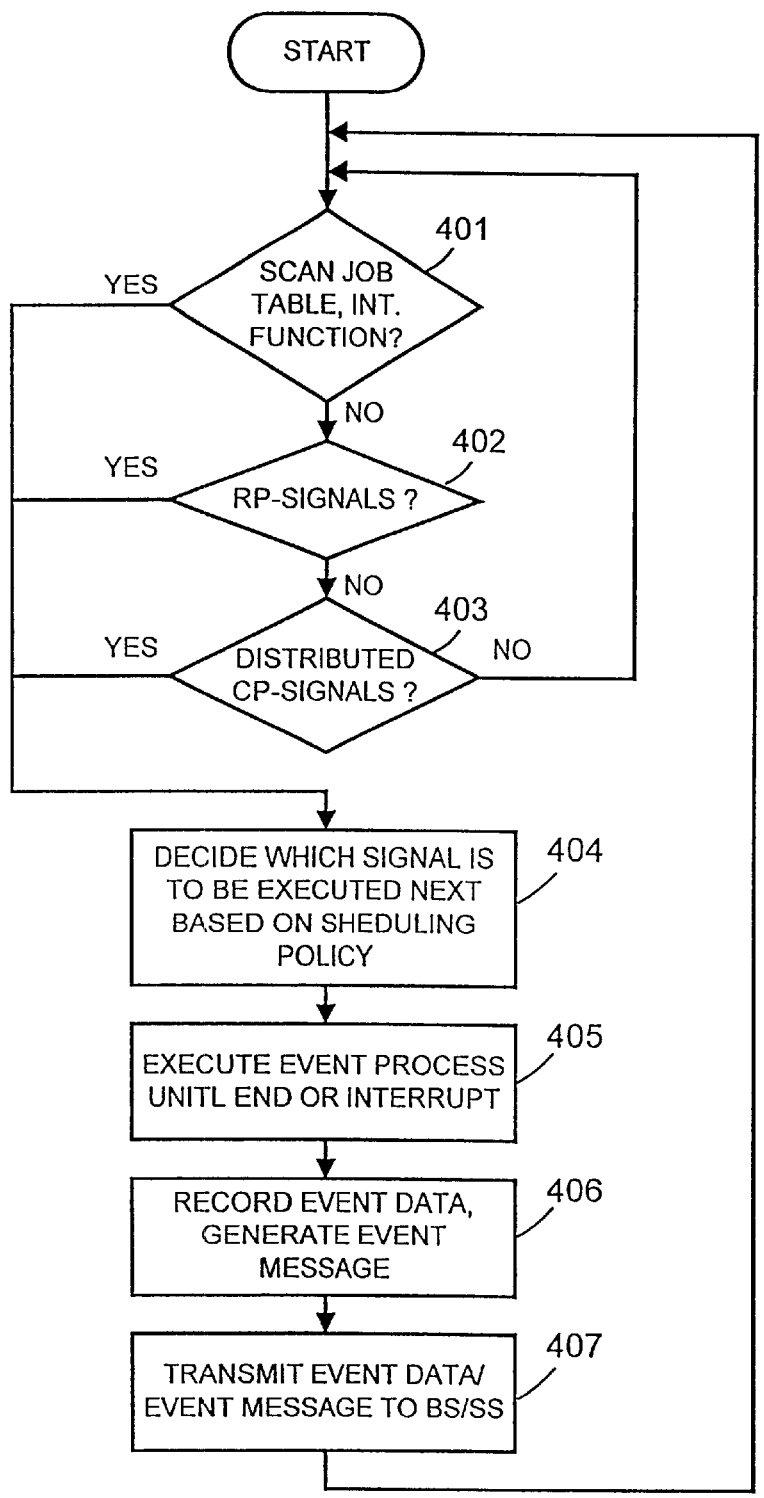
FIG. 4 shows a second example of the method of fault tolerant operation of a computer system according to the invention.

In the following, with respect to FIG. 4, a second embodiment of the method of fault tolerant operation of a computer system is described. FIG. 4 shows a more detailed example of the processing of commands, and the execution of event processes, respectively. Again, the flow primarily concerns operations of the primary system.

After starting operations at the primary system, at a central primary processing unit, in a step 401 it is decided, whether a job table is to be scanned according to a timer interrupt. The job table may include a sequence of jobs to be executed. The scanning of the job table may include determining the correctness of the sequence of jobs, determining which job is to executed next, etc. In step 401, it may also be determined, whether another internal system function is to be executed. In other words, in step 401, it is determined whether an internal command requesting the execution of an event process occurred.

In the present example, it call can be assumed that the primary system is connected to regional processors and distributed central processors of a network of processors. The computer system may, e.g., operate a telecommunications system.

If in step 401 no internal command is detected, in a step 402 it is determined whether any regional processor signals are received. These regional processor signals may be commands requesting the execution of event processes. In case no such signals or commands were detected in step 402, in a step 403 it is determined, whether any distributed central processor signals did arrive at the primary system. The distributed central processor signals may also be commands requesting the execution of event processes. An event process may also be constituted by the start of execution of a system function or an external function, such as a service function in a telecommunications network. The primary system may only execute event processes, other actions affecting the system state, system data or application data are not allowed.

If in step 403 no distributed central processor signals are detected, the flow returns to step 401.

If during any of the steps 401, 402 and 403 the reception of a command or event requesting the execution of an event process is detected, in a step 404 it will be decided which signal is to be executed next, based on a scheduling policy. Besides commands detected in steps 401, 402 and 403, a job buffer may be provided with requests for execution of event processes, so that in step 404 priority considerations may be applied.

After selecting the next event process to be executed, in a step 405, the event process is executed until normal termination or until the occurrence of an interrupt.

Subsequently, in a step 406, event data are recorded, indicative of the course of execution of the event process until halting the event process. The event data may be used at a later point in time for detecting a faulty operation at the primary system and/or backup system and/or standby systems. Further, in step 406, an event message will be generated, at least indicating the type of event process and the reason for halting the event process.

Following, in a step 407 the generated event data and/or generated event message is transmitted to the at least one backup system and/or standby system.

Thereafter, the flow returns to step 401.

Figure 5:
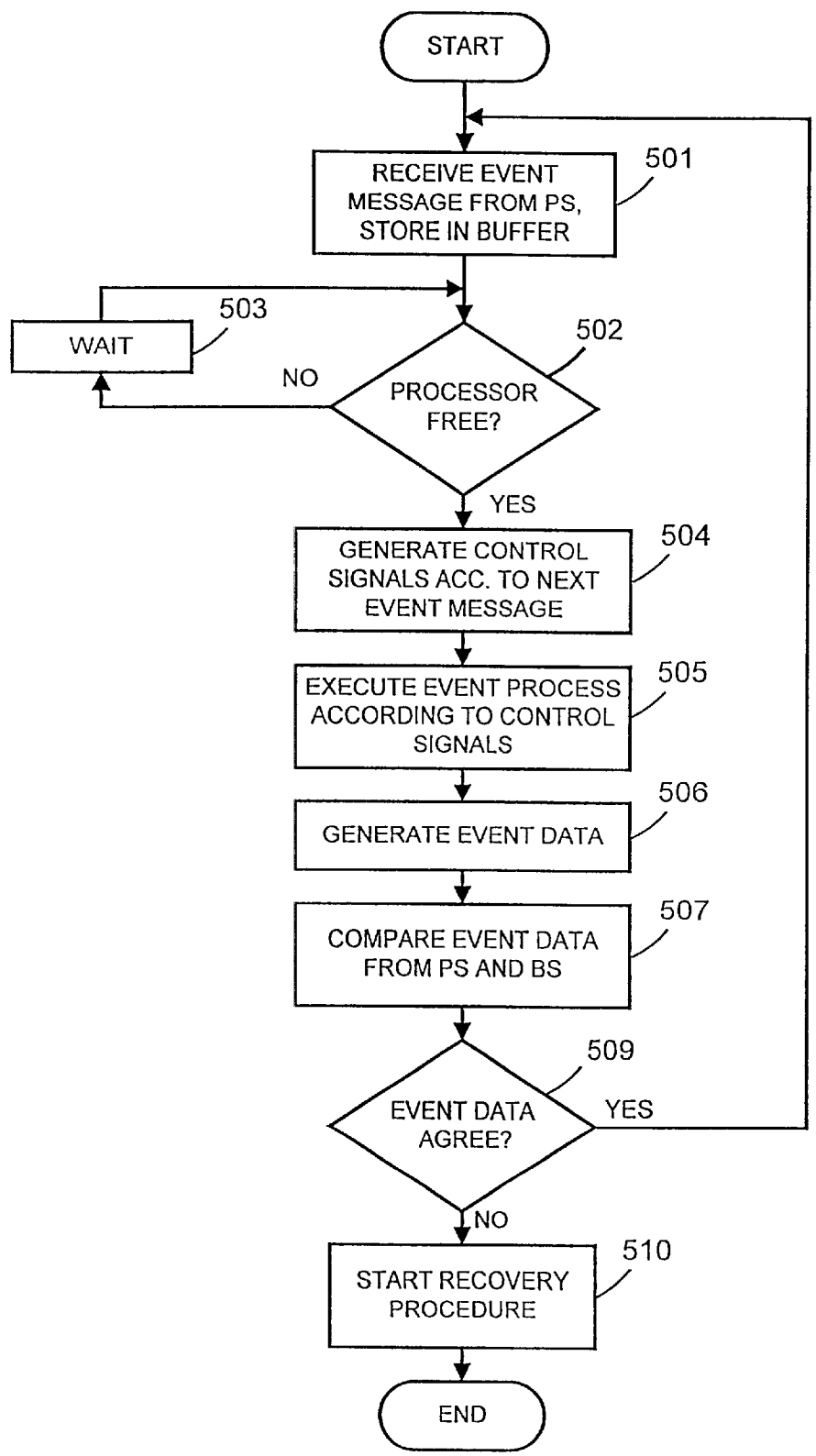
FIG. 5 shows a third example of the method of fault tolerant operation of a computer system according to the invention.

FIG. 5, shows a further example of execution of the method of fault tolerant operation of a computer system. In the following, operations at the backup systems will be described with respect to FIG. 5.

The system configuration is similar to the one described with respect to the previous embodiments.

As specifically outlined with respect to FIGS. 1 and 2, the backup system is arranged to receive event messages, identifying type of event processes and execution particulars at the primary system, such that the backup system is subsequently able to execute the same event process in the same manner, as it was executed in the primary system, including halting the event process intermediately or terminating the event process.

In a step 501 the backup system receives an event message from the primary system. In case a backlog of event messages, i.e., not yet executed event processes corresponding to earlier event messages, at the backup system, the backup system may intermediately store the event message in a buffer.

In a step 502 it is determined, whether the backup central processing unit is available for execution of the event process, corresponding to the event message received previously in step 501. In case event messages were intermediately stored in the buffer, e.g., in a FIFO buffer, the event message received first, will be scheduled for execution. However, if the desired execution sequence can not be determined from the order of reception of event messages, the order of execution may also follow a sequence number which may, for example, be included into each event message. The sequence number preferably indicates the sequence of execution of event messages at the primary system. The scheduling for execution may be performed by a backup control unit, as outlined with respect to FIG. 1.

In case the processor is unavailable, in a step 503, the backup control means may wait, until the processor is available.

In a step 504 the backup control means reads the next event message, and generates control signals according to the event message. The control signals are transmitted to the backup central processing unit and will cause execution of the corresponding event process at the backup system. This may, e.g., involve changing system data or application data stored in backup memory means. The control signals, according to the event message, will also cause halting the event process analogously to the previously halting the event process at the primary system. This may involve generating an interrupt, identically to an interrupt generated previously at the primary system.

After halting the event process, in a step 506, event data are generated, indicative of the course of execution of the event process at the backup system.

In a step 507, if fault detection means are incorporated into the backup system, the event data generated at a backup system may readily be compared to the event data generated at the primary system and, e.g., received with the event message at the backup system. The comparison result may be transmitted to the primary system.

In the case in step 509 it is determined that the event data of the primary system and the backup system agree, the flow returns to step 501, and the next event process in line will be scheduled for execution.

In case in step 509 it is determined that the event data do not agree, in a step 510 a recovery procedure is performed. The recovery procedure preferably includes detecting at which of the involved systems, the primary system or backup system, the fault occurred. The recovery procedure may include selecting the backup system, or in case a plurality of backup systems are present, selecting one of the backup systems to assume functions as new primary system. It may also include to decide which event process was the last successfully executed one at the primary system, e.g., based on event data generated at the primary system, and may include transmitting information on the last successfully executed event process to all involved backup systems and/or standby systems. Further, a takeover message may be sent to all remaining backup and standby systems and to all other devices of the fault tolerant computer system.

Figure 6:
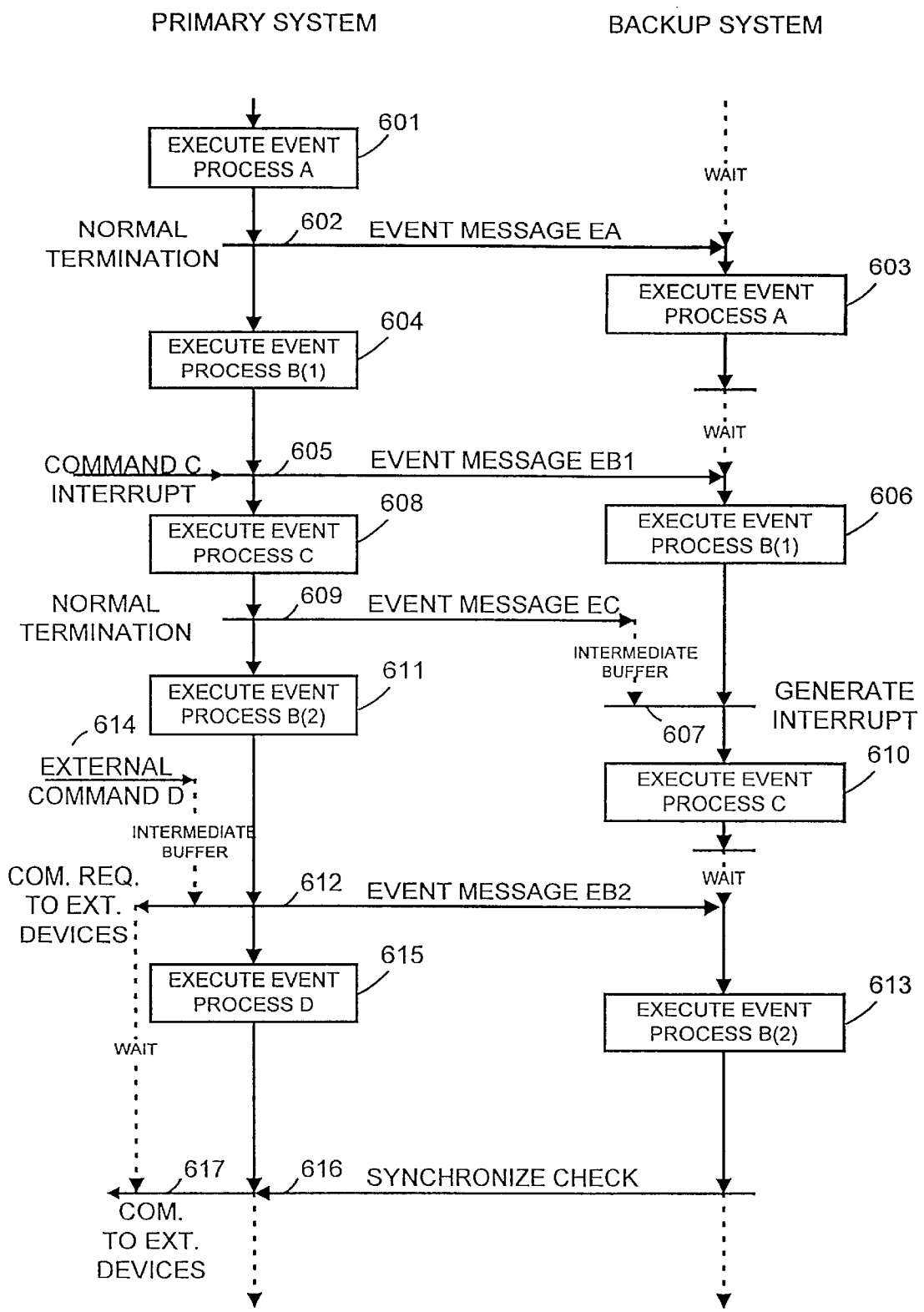
FIG. 6 shows a time/flow diagram of an example of operation of the system according to the invention, including a primary system and a backup system.

In the following, with respect to FIG. 6 an example of a specific execution of a sequence of event processes by the fault tolerant computer system according to the invention including a primary system and a backup system.

It is assumed that event processes A, B, C and D are to be executed. Their execution may be performed as outlined in previous examples. In particular, after executing an event process at the primary system, an event message including the reason for termination of the event process will be generated at the primary system and transmitted to the backup system. After reception of the event message at the backup system, in case no other event process is currently executed, the event process corresponding to the received event message will be executed at the backup system. Further, in case a communication request to external devices is detected at the primary system, before performing a communication operation with the external device, the primary system preferably waits for a signal indicating a fault free operation at the primary system. Within this time period, other events may be executed at the primary system.

In a step 601 an event process A is executed at the primary system. It is assumed that the execution of the event process A comes to a normal end, that is, normal termination is detected at the primary system. Accordingly, in a step 602 an event message EA is transmitted to the backup system, as was outlined before. The event message, e.g., includes information about the type of event process, system data and/or application data affected, the reason for halting the event process. Since the event message includes all necessary information relating to the type and execution of the event process A at the primary system, subsequent to receiving the event message EA at the backup system, the event process A may be executed in exactly the same manner at the backup system. This will involve accessing the same data at the backup system as before at the primary system during the execution of event processes A at the primary system.

When the event process A is executed at the backup system, a second event process B(1) (part one) is executed at the primary system in a step 604.

It now be assumed that during the execution of event processes B (part one) a command C, requesting the execution of an event process C, generates an interrupt and causes the interruption of the execution of event process B(1) (part one). According to the invention, in a step 605 an event message EB1 is generated at the primary system and transmitted to the backup system.

Since the execution of event process A was normally terminated, before the event message EB1 was received at the backup system, a short wait period occurs at the backup system before the corresponding event process B(1) (part one) can be executed at the backup system. In a step 606 at the backup system event process B(1) (part one) is executed and, since information about the interrupt due to command C was also included into the event message EB1, event process B is interrupted at the backup system at exactly the same point in time during execution. To facilitate a correct interrupt at the backup system, a number of executed instructions may be included into the event message. The generation of the interrupt at the backup system is indicated at reference sign 607.

When the event process B(1) is executed at the backup system, at the primary system, the event process C, which generated the interrupt, is executed in a step 608.

In the present example, it is assumed that event process C is terminated normally and a corresponding event message EC is transferred to the backup processor in a step 609. However, at the time of reception of the event message C at the backup system, the backup system is still busy executing the first part of event process B(1), since the interrupt is not scheduled to occur at that point in time. Therefore, the event message EC is e.g., stored in an intermediate buffer, until the scheduled interrupt occurs at the backup system.

After the induced interrupt of event process B at the backup system, the backup system now executes the event process C specified in the intermediately stored event message EC (step 610).

At the same time, in a step 611, since event process C was normally terminated at the primary system, the primary system resumes execution of the interrupted event process B. After a normal termination of the second part of the event process B(2), the primary system generates and transmits an event message EB2 to the backup system in a step 612.

Since, with event message EB1 the exact state of the primary system at the time of interrupt due to command C is known at the backup system, the backup system can now, in a step 613, resume execution of event process B2, until normal termination. It is noted that, register states of the primary system may have been transmitted to the backup system, even though, upon generating the artificial interrupt at the backup system, the same register states should be present at the backup system, as they were present at occurrence of the interrupt at the primary system due to command C.

It be assumed that during execution of the second part of event process B(2), after resuming execution of event process, in a step 614 an external command D is received from an external device, which may be, in the case of a telecommunication system, a regional processor or a distributed central processor.

After normal termination of event process B, at the primary system, in a step 615 event process D can be executed.

It also be assumed that event process B will cause a communication request to an external device. However, in order to avoid propagation of faulty operation within the primary system, the communication request is put on hold until fault free operation at the primary system is determined. Thus, before executing the communication to the external device, the primary system waits for a signal indicating an agreement of event data generated upon execution of the event process B at the primary system and generated upon execution of the event process B at the backup system. If in a step 616 a synchronize check indicates that no fault has occurred at the primary system, in a step 617 the communication to the external device may be performed.

It is noted that the illustrated example only describes a possible course of operation of the fault tolerant computer system. For example, not in all cases communication requests are put on hold, e.g., non-critical communications as well as time/critical communications may be performed without waiting for the above synchronize check.

Figure 7:
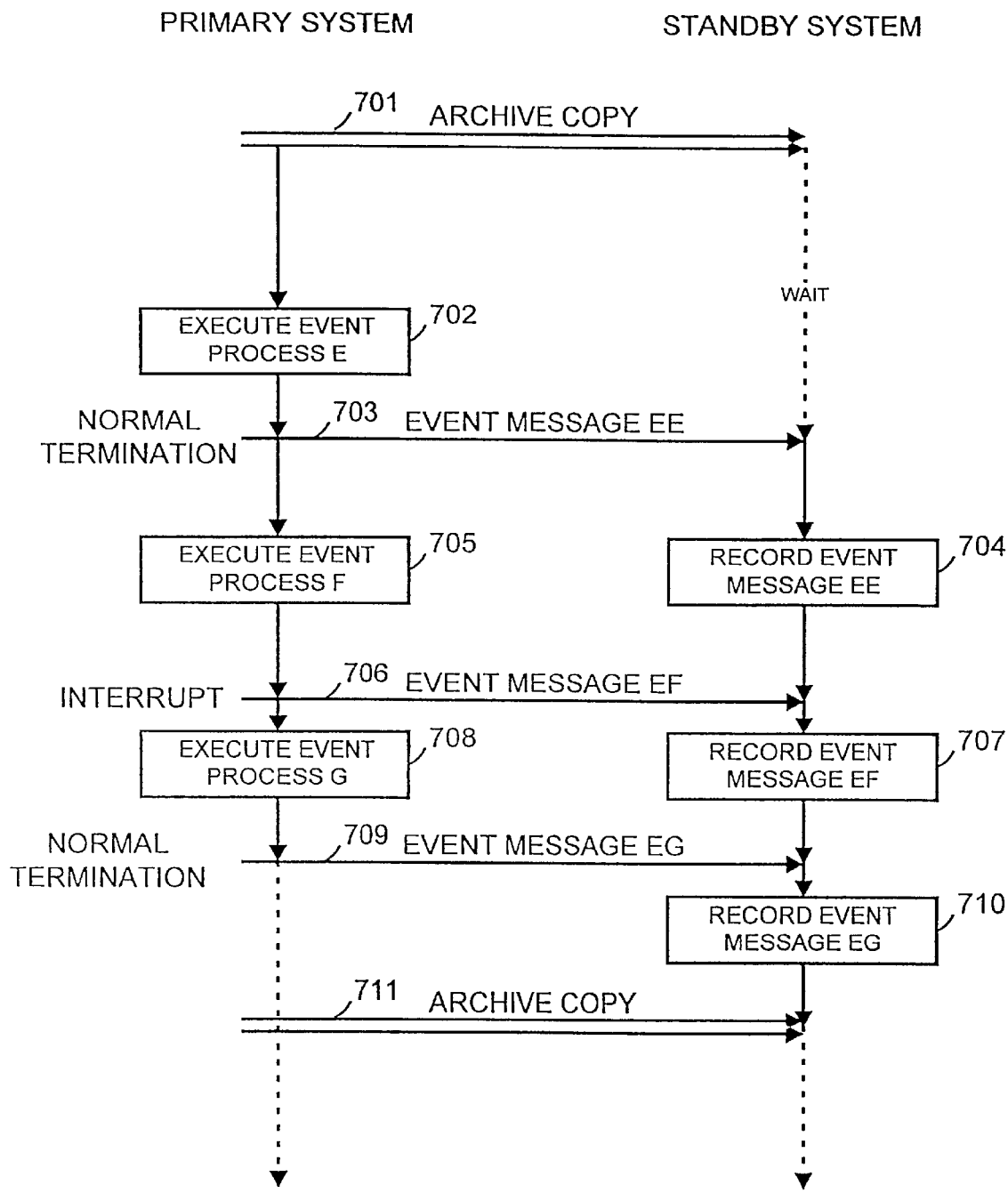
FIG. 7 illustrates an example of operation of an embodiment of the system according to the invention, including a primary system and a stand-by system.

In the following, with respect to FIG. 7 a further example of operation of the fault tolerant computer system according to the invention will be described. In this case, primarily communications and operations of the primary system and the standby system will be illustrated.

The standby system is arranged to store an archive copy of memory contents from the primary system. An archive copy is preferably generated in predetermined time intervals. Further, the standby system records event messages in an event log, for recovering the system state of the primary system or of a backup system, once a fault is detected.

The operation of the system will be illustrated using exemplary event processes E, F and G.

In a first step, denoted 701, a first archive copy is transferred from memory means of the primary system to memory means of the standby system. Preferably, the archive copy includes all relevant application data and/or all relevant system data. Thus, the memory content of the standby memory means represents the memory state of the primary system at a certain point in time, when the archive copy was generated.

Following, in a step 702 an event process E executed at the primary system, as outlined before, and upon a normal termination of event process E an event message EE is transferred to the standby system in a step 703. At the standby system, in a step 704, the event message E is recorded in an event log.

Around the same time, at the primary system an event process F is executed in a step 705, which at a certain point in time is interrupted. Accordingly, in a step 706 and event message EF including all necessary data specifying event process F and the interrupt is transferred to the standby system.

At the standby system, in a step 707 the event message EF is recorded in the event log. Similarly, in a step 708, an event process G is executed, and upon normal termination of the event process G an event message EG is transferred to the backup system in a step 709. The event message EG is recorded in the event log in a step 710.

With the archive copy generated at the standby system in step 701, and the recorded event messages of the event log, comprising a sequence of all event messages transferred from the primary system, the system state of the primary system may be reconstructed, as it was outlined before.

Archive copies may be generated in certain time intervals. After transferring a new archive copy, as indicated with a step 711, all previously recorded event messages of the event log may be erased and a new event log may be started. Hence, it is always possible to reconstruct the system state of the primary system up to the event process corresponding to the last event message recorded in the event log at the standby system.

In the following, with respect to FIG. 8 another embodiment of the fault tolerant computer system according to the invention will be described.

Figure 8:
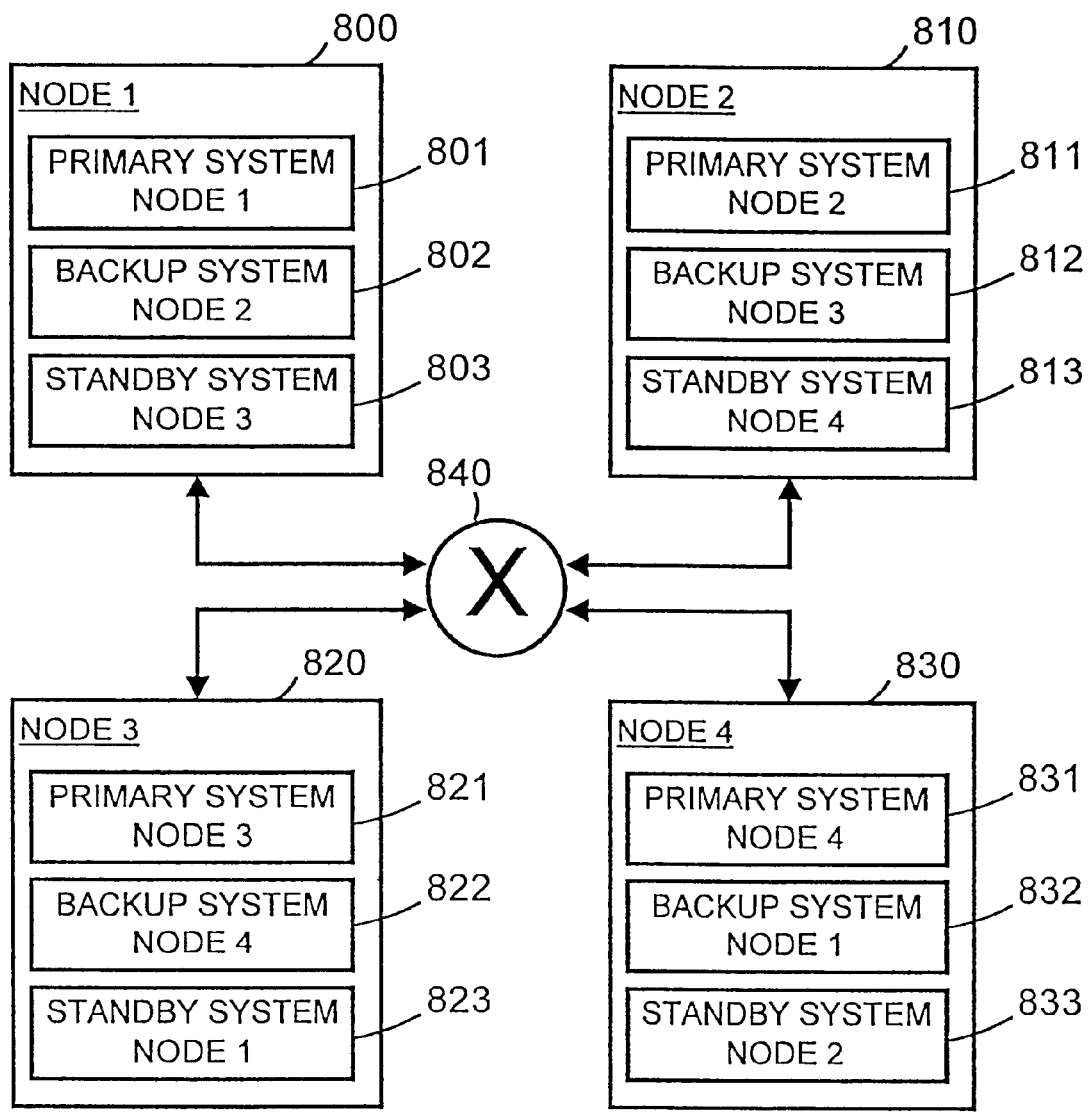
FIG. 8 illustrates a plurality of processing nodes, each including a primary system, a backup system and a standby system.

FIG. 8 shows 4 processing nodes 800, 810, 820 and 830 of a fault tolerant computer system according to the invention. The processing nodes are connected via a network 840, which may be a cluster interconnect.

Each of the processing nodes comprises a primary system, a backup system and a standby system. It is noted that the standby system does not necessarily have to be provided, in other embodiments, a processing node may only comprise of a primary system and a backup system.

As indicated in FIG. 8, the first processing node 800 comprises a primary system 801 for the first processing node 800, and comprises a backup system 802 for the second processing node 810 and comprises a standby system 803 for the third processing node 820.

Analogously, the second processing node 810 comprises a primary system 811 for the second processing node 810, a backup system 812 for the third processing node 820 and a standby system 813 for the fourth processing node 830.

The third processing node 820 comprises a primary system of the third processing node 820, a backup system of the fourth processing node 830 and a standby system of the first processing node 800.

Finally, the fourth processing node 830 comprises a primary system 831 of the fourth processing node 830, a backup system 832 of the first processing node 800 and a standby system 833 of the second processing node 810.

By mutually assigning primary backup and standby functions, the fault tolerance can be improved. It is noted, that an arbitrary number of processing nodes may be provided, each one comprising a primary, backup and/or standby system. Even though the primary processing units, the backup processing units and the standby processing units are each illustrated in FIG. 8 as independent entities, they may be constituted by a single processor, i.e. functions of a primary system, a backup system and/or a standby system may be executed by a single processing unit.

What is claimed is:

1. A fault tolerant computer system, comprising:
   a primary system connected to external devices, including:
   a primary central processing unit for executing event processes, each of the event processes being a process executed upon the occurrence of a command at the primary system;
   primary memory means connected to the primary central processing unit for storing system data and application data; and
   an event generator connected to the primary central processing unit for generating an event message each time the primary central processing unit halts the execution of a halted one of the event processes, the event message at least including information about the type of the halted event process and the reason for halting the execution of the halted event process; and
   at least one backup system connected to the primary system, including:
   a backup central processing unit for executing the event processes;
   backup memory means connected to the backup central processing unit for storing the system data and the application data;
   a buffer for receiving and intermediately storing a sequence of the event messages from the primary system; and
   backup control means connected to the backup central processing unit, for scheduling the execution of the event processes in accordance with the event messages.

2. The fault tolerant computer system according to claim 1, wherein the event generator generates the event message upon an interrupt of the halted event process and upon normal termination of the halted event process.

3. The fault tolerant computer system according to claim 1, further comprising:
   first means for generating first event data indicative of the execution of one of the event processes at the primary system;
   second means for generating event data indicative of the execution of the same one of the event process at the at least one backup system; and
   means for detecting a system fault based on a comparison of the first and second event data, and, in case a system fault at the primary system is detected, for selecting one of the at least one backup systems to assume function as a new primary system.

4. The fault tolerant computer system according to claim 1, wherein event data about the execution of the halted event process at the primary system is included into the corresponding event message.

5. The fault tolerant computer system according to claim 1, further comprising at least one standby system, including:
   first standby memory means for receiving and storing an archive copy of the system data and the application data; and
   second standby memory means for recording, after the archive copy was generated, a sequence of the event messages in an event log.

6. The fault tolerant computer system according to claim 5, wherein the standby system further includes:
   a standby central processing unit connected to the first standby memory means and second standby memory means; and
   standby control means connected to the standby central processing unit, for scheduling the execution of a sequence of the event processes corresponding to the sequence of event messages stored in the event log.

7. The fault tolerant computer system according to claim 1, wherein the external devices are regional processors or distributed central processors of a distributed system.

8. The fault tolerant computer system according to claim 1, wherein the event processes are constituted by at least one of the group consisting of:
   executing a command from a regional processor;
   executing a command from a distributed central processor;
   scanning of a job table due to a timer interrupt; and
   execution of an internal command of the primary system.

9. The fault tolerant computer system according to claim 1, wherein the event message further includes at least one of the group including:
- a sequence number indicating an execution sequence of the halted event process;
- number of instructions executed;
- register states upon occurrence of an interrupt; and
- information regarding data defined or accessed by the halted event process.

10. The fault tolerant computer system according to claim 1, wherein upon detection of a software fault at the primary system, the event message includes information specifying the software fault, and the backup system skips execution of at least part of the corresponding halted event process.

11. The fault tolerant computer system according to claim 1, further including:
- a plurality of processing nodes, each including at least one of the group including:
  - a primary system of a first processing node;
  - a backup system of a second processing node;
  - a standby system of a third processing node; and
  - means for interconnecting all processing nodes.

12. The fault tolerant computer system according to claim 11, wherein the primary processing unit, the backup processing unit and at least one of the plurality of processing nodes are constituted by a single processor.

13. A fault tolerant computer system, comprising:
- a primary system connected to external devices, including:
  - a primary central processing unit for executing event processes, each of the event processes being a process executed upon the occurrence of a command at the primary system;
  - primary memory means connected to the primary central processing unit for storing system data and application data; and
  - an event generator connected to the primary central processing unit for generating an event message each time the primary central processing unit halts the execution of one of the event processes, the event message at least including information about the type of halted event process and the reason for halting the execution of the halted event process;
- at least one backup system connected to the primary system, including:
  - a backup central processing unit for executing the event processes;
  - backup memory means connected to the backup central processing unit for storing the system data and the application data;
  - a buffer for receiving and intermediately storing a sequence of the event messages from the primary system;
  - backup control means connected to the backup central processing unit, for scheduling the execution of the event processes in accordance with the event messages; and
- at least one standby system, including:
  - first standby memory means for receiving and storing an archive copy of the system data and the application data; and
  - second standby memory means for recording, after the archive copy was generated, a sequence of the event messages in an event log.

14. A fault tolerant computer system, comprising:
- a primary system connected to external devices, including:
  - a primary central processing unit for executing event processes, each of the event processes being a process executed upon the occurrence of a command at the primary system;
  - primary memory means connected to the primary central processing unit for storing system data and application data;
  - an event generator connected to the primary central processing unit for generating an event message each time the primary central processing unit halts the execution of one of the event processes, the event message at least including information about the type of halted event process and the reason for halting the execution of the halted event process;
- at least one backup system connected to the primary system, including:
  - a backup central processing unit for executing the event processes;
  - backup memory means connected to the backup central processing unit for storing the system data and the application data;
  - a buffer for receiving and intermediately storing a sequence of the event messages from the primary system;
  - backup control means connected to the backup central processing unit, for scheduling the execution of the event processes in accordance with the event messages; and
- wherein upon detection of a software fault at the primary system, the event message includes information specifying the software fault, and the backup system skips execution of at least part of the corresponding halted event process.

15. A method for fault tolerant operation of a computer system, including a primary system and at least one backup system, comprising the steps of:
- at the primary system:
  - executing event processes by a primary central processing unit, each of the event processes being a process executed upon the occurrence of a command at the primary system;
  - generating an event message each time the primary central processing unit halts the execution of one of the event processes, the event message at least including information about the type of the halted event process and the reason for halting execution of the halted event process;
  - transmitting each event message to the at least one backup system; at the at least one backup system:
  - recording and intermediately storing the event messages from the primary system in a buffer;
  - scheduling the execution of the event processes of the corresponding event messages at the buffer; and
  - executing the event processes by the backup central processing unit in accordance with the event messages.

16. The method for fault tolerant operation of a computer system according to claim 15, further comprising the step of: generating the event message upon an interrupt of the halted event process and upon normal termination of the halted event process.

17. The method for fault tolerant operation of a computer system according to claim 15, further comprising the steps of:
- generating first event data indicative of the execution of one of the event process at the primary system;
- generating second event data indicative of the execution of the same event process at the at least one backup system; and
- detecting a system fault based on a comparison of the first and second event data; and in case a system fault of the primary system is detected, selecting one of the at least one backup systems to assume function as a new primary system.

18. The method of fault tolerant operation of a computer system according to claim 15, further comprising the steps of:
   receiving and storing, at at least one standby system, an archive copy of the system data the and application data from the primary system; and
   recording, in an event log at the at least one standby system, a sequence of the event messages, generated at the primary system after the archive copy was generated.

19. The method of fault tolerant operation of a computer system according to claim 18, further comprising the steps of:
   scheduling, in case at least one of the standby systems has to assume functions as a backup system, the execution of a sequence of the event processes corresponding to the event messages stored in the event log; and
   executing the event processes specified by the event messages at the standby central processing unit and applying corresponding changes to the archive copy.

20. The method of fault tolerant operation of a computer system according to claim 15, wherein the event processes are constituted by at least one of the group including:
   executing a command from a regional processor;
   executing a command from a distributed central processor;
   scanning of a job table due to a timer interrupt; and
   execution of an internal function of the primary system.

21. The method of fault tolerant operation of a computer system according to claim 15, wherein the event message further includes at least one of the group including:
   a sequence number indicating an execution sequence of the halted event process;
   number of instructions executed;
   register states upon occurrence of an interrupt; and
   information regarding data defined or accessed by the halted event process.

22. The method of fault tolerant operation of a computer system according to claim 15, wherein upon detection of a software fault at the primary system, the event message includes information specifying the software fault, and the backup system skips execution of at least part of the corresponding halted event process.

23. The method of fault tolerant operation of a computer system according to claim 15, wherein the at least one backup system executes the event processes in the order of reception of the corresponding event messages at the buffer or as specified by a sequence number indicating the execution sequence of the event processes at the primary system.

24. The method of fault tolerant operation of a computer system according to claim 15, wherein selecting the backup system to assume functions as a new primary system includes:
   deciding, which of the event processes was the last successfully executed one;
   transmitting information on the last successfully executed event process to the at least one backup system and the at least one standby system; and
   sending take over messages to the at least one backup and standby system.

25. The method of fault tolerant operation of a computer system according to claim 15, wherein the primary system communicates to an external device only after the at least one backup system completes execution of a previous one of the event process and a system fault was not detected.

26. A method of fault tolerant operation of a computer system, including a primary system, at least one backup system and at least one standby system, comprising the steps of:
   at the primary system:
      executing event processes by a primary central processing unit, each of the event processes being a process executed upon the occurrence of a command at the primary system;
      generating an event message each time the primary central processing unit halts the execution of one of the event process, the event message at least including information about the type of the halted event process and the reason for halting execution of the halted event process;
      transmitting each event message to at least one backup system;
   at the at least one backup system:
      recording and intermediately storing the event messages from the primary system in a buffer;
      scheduling the execution of the event processes of the corresponding event messages at the buffer;
      executing the event processes by the backup central processing unit in accordance with the event messages;
   at the at least one standby system:
      receiving and storing an archive copy of the system data and the application data from the primary system; and
      recording, in an event log at the at least one standby system, a sequence of the event messages, generated at the primary system after the archive copy was generated.

27. A method of fault tolerant operation of a computer system, including a primary system and at least one backup system, comprising the steps of:
   at the primary system:
      executing event processes by a primary central processing unit, each of the event processes being a process executed upon the occurrence of a command at the primary system;
      generating an event message each time the primary central processing unit halts the execution of one of the event processes, the event message at least including information about the type of the halted event process and the reason for halting execution of the halted event process;
      transmitting each event message to at least one backup system;
   at the at least one backup system:
      recording and intermediately storing the event messages from the primary system in a buffer;
      scheduling the execution of the event processes of the corresponding event messages at the buffer; and
      executing the event processes by the backup central processing unit in accordance with the event messages; and
   wherein upon detection of a software fault at the primary system, the event message includes information specifying the software fault, and the backup system skips execution of at least part of the corresponding halted event process.

* * * * *

UNITED STATES PATENT AND TRADEMARK OFFICE
CERTIFICATE OF CORRECTION

PATENT NO.     : 6,438,707 B1                                    Page 1 of 1
DATED          : August 20, 2002
INVENTOR(S)    : Mikael Ronström It is certified that error appears in the above-identified patent and that said Letters Patent is hereby corrected as shown below:

<u>Column 3,</u>
Line 67, replace "In case of a" with -- In case a --

<u>Column 7,</u>
Line 64, replace "(the. execution" with -- (the execution --

<u>Column 14,</u>
Line 43, replace "it call can" with -- it can --

Signed and Sealed this

Fourth Day of March, 2003

JAMES E. ROGAN
*Director of the United States Patent and Trademark Office*